March 16, 1943.    R. A. GEISELMAN    2,313,931
ELECTRICAL REGULATING SYSTEM
Filed Jan. 8, 1941    2 Sheets-Sheet 2
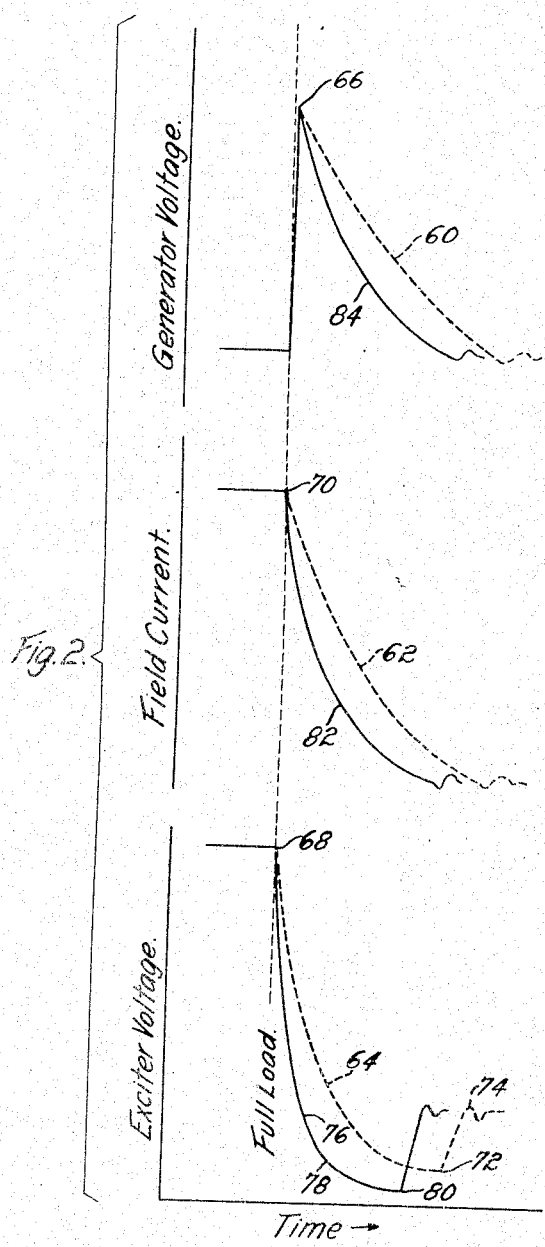
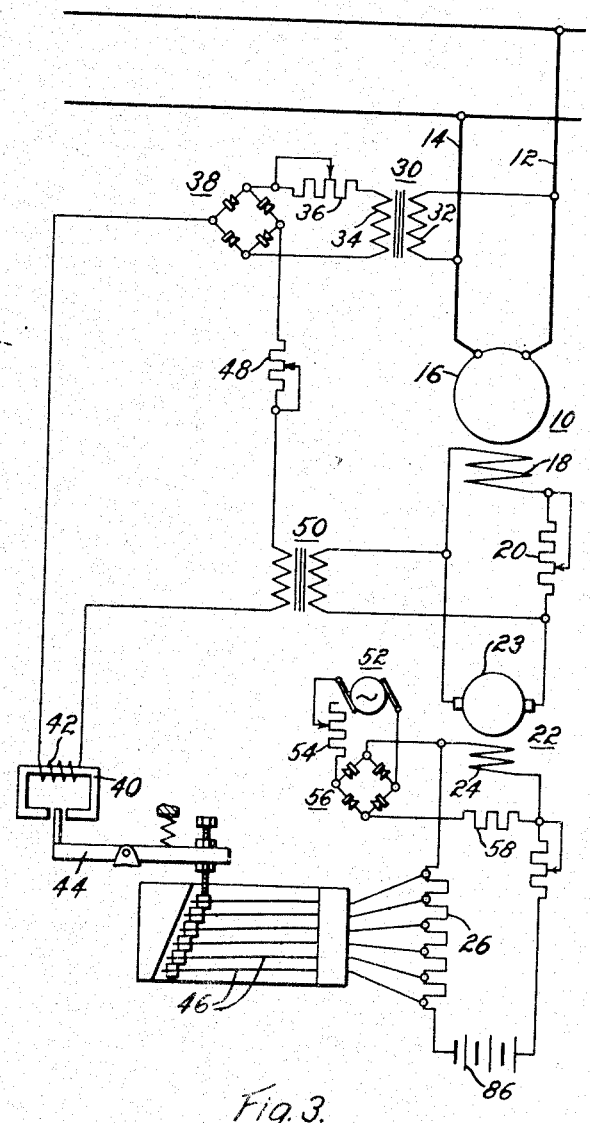
WITNESSES:
INVENTOR
Ralph A. Geiselman.
BY
ATTORNEY Patented Mar. 16, 1943

2,313,931

UNITED STATES PATENT OFFICE 2,313,931

ELECTRICAL REGULATING SYSTEM

Ralph A. Geiselman, Wilkinsburg, Pa., assignor to Westinghouse Electric & Manufacturing Company, East Pittsburgh, Pa., a corporation of Pennsylvania Application January 8, 1941, Serial No. 373,541

7 Claims. (Cl. 171—119)

This invention relates to electrical regulating systems.

Motor generator sets are employed for supplying power to variable loads. In particular the generator is utilized for supplying power for inductively heating furnaces, the power demand varying in accordance with the charge heated in the furnace. As the load in the furnace changes, it becomes necessary to effect changes in the excitation of the generator field in order to maintain the generator voltage at a desired value.

Heretofore, numerous attempts have been made to effect the desired change in the excitation of the generator field by inserting additional resistance in circuit with the field which in effect so limits the excitation of the field that the generator cannot carry full load, and in addition excessive heating losses are encountered. Further, the change in the excitation of the generator must be quite fast in order to correct for the change in the load conditions.

It is an object of this invention to provide a quick decrease in the exciter field current to control the excitation of the generator utilized for supplying a variable load having a leading power factor.

Other objects of this invention will best be understood through the following description when taken in conjunction with the accompanying drawings, in which:

Fig. 2 is a graph, the curves of which illustrate the operating characteristics of the system of this invention; and Fig. 3 is a diagrammatic view of apparatus and circuits illustrating another embodiment of this invention.

Figure 1:
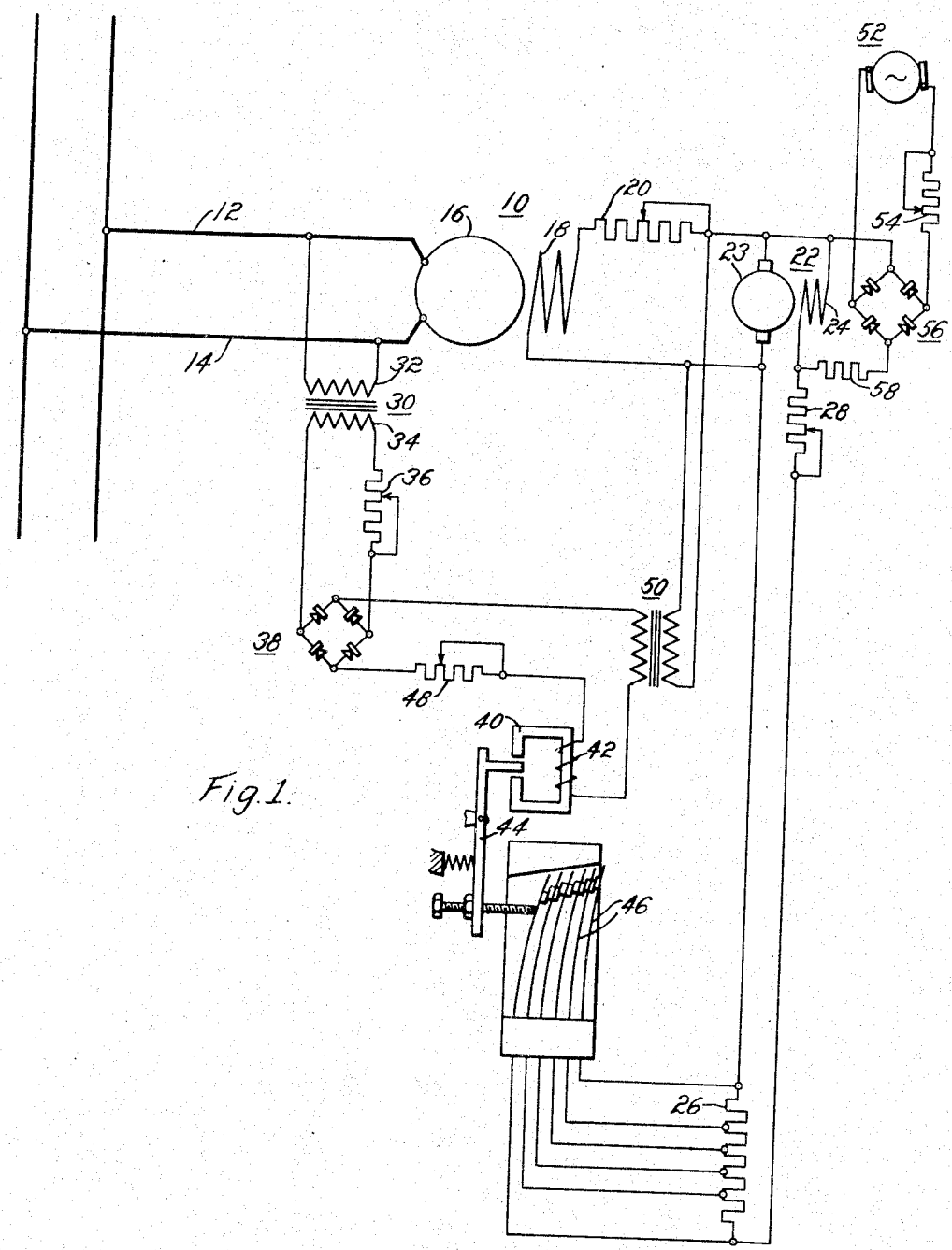
Figure 1 is a diagrammatic representation of apparatus and circuits illustrating an embodiment of this invention.

Referring to Figure 1, there is represented a generator 10 electrically connected by conductors 12 and 14 to a variable load (not shown) such as an induction furnace or the like, which has a leading power factor. The generator 10 is provided with an armature 16 and a separately excited field winding 18 and is preferably of the constant speed type driven by a motor (not shown).

The field winding 18 of the generator 10 is connected through a variable field rheostat 20 to an exciter 22 for energizing the field winding. The exciter 22 comprises an armature 23 connected across the field winding 18 of the generator 10 and a shunt field winding 24. In order to control the excitation of the exciter 22, a variable field rheostat 26 and a variable resistor 28 are connected in series with one another and with the shunt field winding 24.

As illustrated, the primary winding 32 of transformer 30 is connected across the supply conductors 12 and 14 in order to obtain a measure of the voltage of the generator 10. The secondary winding 34 of transformer 30 is connected through a variable resistor 36 to a rectifying device 38 for converting the alternating current delivered by the generator 10 to direct current.

The apparatus employed for varying or controlling the amount of the resistor 26 in circuit with the shunt field winding 24 of the exciter 22 is well known and is described in detail in the copending application of Clinton R. Hanna et al., Serial No. 203,876, filed April 23, 1938, and assigned to a common assignee. Briefly, this control apparatus comprises a magnetic structure formed of a core member 40 having an energizing winding 42 associated therewith and an armature member 44 disposed for actuating a plurality of spring leaf members 46, each of which is electrically connected by a conductor or lead to a portion of the resistor 26 for progressively short circuiting or inserting portions of the resistor 26 in the circuit in a predetermined manner. As illustrated, the energizing winding 42 of the electromagnetic device 40 is so connected through a variable resistor 48 to the rectifying device 38, that the energization of the winding 42 is a direct measure of the voltage of the generator 10. In order to prevent hunting and to dampen oscillations, a damping transformer 50 is connected in circuit relation with the energizing winding 42 of the electromagnetic device 40 across the armature 23 of the exciter 22.

Referring to the shunt field winding 24 of the exciter 22, a separate source of direct current is electrically connected across the field winding 24 to oppose the field excitation which is controlled by the voltage of the generator 10. Any suitable source of direct current may be employed and in this modification an alternating current generator 52 with a rectifier 56 is illustrated.

The generator 52 is connected through the variable rheostat 54 to the rectifying device 56 which functions to convert the alternating current to direct current which is supplied to the field winding 24 in opposition to the exciter armature voltage. A high resistance unit 58 is electrically connected in circuit between the rectifying device 56 and the field winding 24 to prevent flow of the normal field current to the source of direct current supplied in opposition to the field current.

In operation, assuming that the generator 10 is supplying power to an induction furnace and that the field rheostat 26 has been so adjusted by means of the electromagnetic device 40 and the spring leaves 46 as to provide the required excitation of the field winding 24 to maintain the required generator voltage, if the load is suddenly reduced or removed then the voltage of the generator 10 is immediately increased. This increase in the generator voltage has an immediate effect and increases the energization of the winding 42 of the electromagnetic device 40 and actuates the armature member 44 in a clockwise direction about its pivot point to effect a separation of the contacts of the spring leaves 46 to immediately insert sections of the resistor 26 in circuit with the field winding 24 of the exciter 22, thereby reducing the excitation of the exciter. With this reduction in the excitation of the exciter 22, the excitation of the field winding 18 of the generator 10 is so decreased as to effect a reduction in the generator voltage.

Referring to Fig. 2 the effect of the operation of this portion of the system of this invention is illustrated by the dotted curves 60, 62 and 64. As illustrated in Fig. 2 it is seen that for any given load the generator 10 has a predetermined voltage which is maintained substantially constant as long as the full load is across the line. The instant that the full load is removed or reduced the generator voltage increases to a point 66 depending upon the amount of load removed. Simultaneously, with this increase in the generator voltage to the point 66, the electromagnetic device 40 and the spring leaves 46 function to insert more of the resistor 26 in circuit with the winding 24 and the exciter voltage drops from a point 68 substantially along the curve 64. At the same time as the exciter voltage is reduced, a reduction is effected in the generator field current from the point 70 along the curve 62. These reductions in the exciter voltage, field current and the generator voltage follow the pattern of the curves 60, 62 and 64, respectively, until the point 72 on curve 64 is reached, which is as low a point of the exciter voltage as it is possible to obtain with the resistors 28 and 26 in circuit with the field winding 24.

By the time the exciter voltage has reached the point 72, the generator voltage following along the curve 60 has approached or approximated the voltage which it is desired to maintain on the generator. At this point the regulating apparatus consisting of the electromagnetic device 40 and the spring leaves 46 and associated apparatus function in response to the decrease in the energization of the winding 42 to remove portions of the resistor 26 from circuit with the field winding 24, so that the excitation of the exciter 22 is increased a slight amount from the point 72 on curve 64 of Fig. 2 to the point 74. At this point the exciter voltage will oscillate slightly until the desired exciter voltage for maintaining the desired field current, and consequently the desired generator voltage, is reached. As is apparent from an examination of curve 64 of Fig. 2, a considerable lapse of time has intervened between the time that the load was first removed from the generator until the point 72 is reached.

By providing and connecting a source of direct current across the shunt field winding 24 of the exciter 22 to oppose the field excitation, it is possible to reduce the time element for securing the desired correction of the generator voltage while at the same time effecting a reduction in the exciter voltage approximating that of the open circuit condition. Assuming that the regulating apparatus has functioned to insert the resistor 26 in circuit with the field winding 24 of exciter 22 to effect a reduction in the excitation of the exciter, it is apparent that with the direct current so superimposed on the field winding 24 as to oppose the field excitation that an acceleration of the decrease in the exciter voltage will be obtained.

Referring to Fig. 2, curve 76 illustrates the acceleration of the decrease of the exciter voltage when a source of direct current is connected across the field winding 24 to oppose the field excitation as compared with the exciter voltage obtained without the opposing direct current on the field 24. With this constant source of direct current superimposed on the field winding 24, the voltage represented by the point 78 which corresponds to the point 72 of curve 64 is reached in a substantially shorter time than where the regulating apparatus is employed without the opposing direct current on the field winding 24. Further, as illustrated by curve 76 with the direct current opposing the field excitation of the exciter 22, a considerably lower exciter voltage, as indicated by point 80, is obtained than can be obtained under the conditions controlling the form of curve 64.

Simultaneously with the change in the exciter voltage as illustrated by curve 76, a corresponding change in the field current, as evidenced by curve 82, and in the generator voltage, as evidenced by the curve 84, is obtained. As clearly illustrated by the generator voltage curves 60 and 84, the desired generator voltage is secured in a much shorter time where the constant direct current source is employed as a bias on the field winding 24 than where the regulating system is employed without the opposing direct current bias.

As illustrated in Fig. 3 of the drawings, the exciter 22 may be separately excited from any suitable source of power such as the battery 86. In this embodiment, the regulating rheostat 26 is connected in series circuit relation with the battery 86 and the field winding 24 of the exciter. The remaining apparatus of the system illustrated in Fig. 3 is the same as that illustrated in Fig. 1. In this particular embodiment, however, the battery 86 and the source of direct current 56 are so connected across the winding 24 of exciter 22 as to normally have an opposite polarity.

Under normal operating conditions, the polarity of the battery 86 will determine the polarity of the field winding 24, since the separate source of excitation 86 is stronger than the direct current source 56. As the load is removed from conductors 12 and 14 and the generator voltage increases, portions of the resistor 26 are inserted in circuit with the field winding 24 to effect the reduction in the excitation of exciter 22. As the voltage across winding 24 is reduced, the voltage from the direct current source superimposed on the winding in opposition to the separate source of excitation reaches a point where it predominates and effects a change in the polarity of the winding 24. This, in turn, effects a change in the polarity of the voltage across the armature 23 of the exciter 22 to effect a reduction in the excitation of the field winding 18 of generator 10. The polarity of the winding 18, however, does not change when the polarity of the field winding 24 of exciter 22 is changed, since the self-induced circulating current from winding 18 of generator 10 is sufficient to prevent any change in the polarity. This change in the polarity of field winding 24 is quite effective for reducing the excitation of the field winding 18 of generator 10 in a very short time.

As will be understood, however, the change in polarity of field winding 24 is present for only a very short period of time until the regulating apparatus comprising the electromagnetic device 40 and the spring leaves 46 function to remove or short circuit sections of the resistor 26 from the circuit with the field winding 24 to reverse the initial change in the polarity and increase the excitation of field winding 24. This reversal of the initial change in the polarity of the exciter field winding 24 is obtained before a change of polarity of the field winding of the generator is effected.

Whether the exciter is separately excited or not, it is seen that with the regulating system of this invention a substantial reduction in time for effecting the regulation is obtained together with a simultaneous reduction in the exciter voltage to a point approximating that of the open circuit conditions for the exciter. Very close control of the generator voltage under changing load conditions where the load has a leading power factor can, therefore, be obtained with this system utilizing the acceleration in the decrease or decay in the exciter voltage.

While this invention has been described with reference to particular embodiments thereof, it is, of course, not to be limited thereto except insofar as is necessitated by the prior art and the scope of the appended claims.

I claim as my invention:

1. In a regulating system, in combination, a motor driven generator for delivering current to a variable load, an exciter having a field winding for the generator, means responsive to the generator voltage for controlling the excitation of the exciter, a source of direct current connected across the exciter field and operative independently of the operation of the voltage responsive control means to oppose the field excitation, and means connected in circuit with the direct current source to prevent the exciter field current from traversing the direct current source, the source of direct current cooperating to accelerate the decrease in the exciter voltage in response to the functioning of the control means.

2. In a regulating system, in combination, a motor driven generator for delivering current to a variable load, an exciter having a shunt field winding for the generator, means responsive to the generator voltage for controlling the excitation of the exciter, a source of direct current connected across the exciter shunt field and operative independently of the operation of the voltage responsive control means to oppose the field excitation, and means connected in circuit with the direct current source to prevent the exciter field current from traversing the direct current source, the source of direct current cooperating to accelerate the decrease in the exciter voltage in response to the functioning of the control means.

3. In a regulating system, in combination, a motor driven generator for delivering current to a variable load, an exciter having a shunt field winding for the generator, means responsive to the generator voltage for controlling the excitation of the exciter, and means for applying a bias to the exciter field to oppose the field excitation and thereby accelerate the decrease in the exciter voltage in response to the functioning of the control means, said biasing means comprising a source of alternating current, and a rectifier connected in circuit with the alternating current source and across the exciter field for delivering a direct current to the exciter field.

4. In a regulating system, in combination, a motor driven generator for delivering current to a variable load, an exciter having a separately excited field winding for the generator, means for separately exciting the field winding of the exciter, means responsive to the generator voltage for controlling the excitation of the separately excited exciter, and a source of direct current connected across the exciter field and operative independently of the operation of the voltage responsive control means to oppose the field excitation, and means connected in circuit with the direct current source to prevent the exciter field current from traversing the direct current source, the source of direct current cooperating to accelerate the decrease in the exciter voltage in response to the functioning of the control means.

5. In a regulating system, in combination, a motor driven generator for delivering current to a variable load, an exciter having a separately excited field winding for the generator, means for separately exciting the field winding of the exciter, means responsive to the generator voltage for controlling the excitation of the separately excited exciter, and means for applying a bias to the exciter field to oppose the field excitation thereby accelerating the decrease in the exciter voltage in response to the functioning of the control means, said biasing means comprising a source of alternating current and a rectifier connected in circuit with the alternating current source and across the exciter field for delivering a direct current to the exciter field.

6. In a regulating system, in combination, a motor driven generator having a field winding for delivering current to a variable load, an exciter having an armature and a field winding, the exciter armature being connected across the field winding of the generator to energize it, means for separately exciting the field winding of the exciter, means responsive to the generator voltage for controlling the excitation of the separately excited exciter, and means for applying a bias to the exciter field to oppose the field excitation and cooperate with the functioning of the control means to accelerate a decrease in the exciter voltage and under predetermined conditions effect a change in the polarity of the exciter field winding, said biasing means including means to prevent the exciter field current from traversing the biasing means.

7. In a regulating system, in combination, a motor driven generator having a field winding for delivering current to a variable load, an exciter having an armature and a field winding, the exciter armature being connected across the field winding of the generator to energize it, means for separately exciting the field winding of the exciter, means responsive to the generator voltage for controlling the excitation of the separately excited exciter, and means for applying a bias to the exciter field to oppose the field excitation and cooperate with the functioning of the control means to accelerate a decrease in the exciter voltage and under predetermined conditions effect a change in the polarity of the exciter field winding, said biasing means including means to prevent the exciter field current from traversing the biasing means, said control means functioning to reverse the initial change in the polarity of the exciter field winding before a change of polarity of the field winding of the generator is effected.

RALPH A. GEISELMAN.